United States Patent
Pulnikov et al.

(10) Patent No.: US 7,786,638 B2
(45) Date of Patent: Aug. 31, 2010

(54) ELECTRIC MACHINE HAVING A HYBRID BEARING

(75) Inventors: Andrey Pulnikov, Villingen-Schwenningen (DE); Vladimir V. Popov, Villingen-Schwenningen (DE); Igor Ross, Freiburg (DE)

(73) Assignee: Mineba Co., Ltd, Nagano (JP)

( * ) Notice: Subject to any disclaimer, the term of this patent is extended or adjusted under 35 U.S.C. 154(b) by 347 days.

(21) Appl. No.: 11/979,444

(22) Filed: Nov. 2, 2007

(65) Prior Publication Data

US 2008/0143205 A1 Jun. 19, 2008

(30) Foreign Application Priority Data

Dec. 19, 2006 (DE) .................. 10 2006 060 047

(51) Int. Cl.
*H02K 7/09* (2006.01)
(52) U.S. Cl. .................. 310/90.5; 310/90; 310/67 R
(58) Field of Classification Search ............ 310/67 R, 310/90, 90.5, 216.004
See application file for complete search history.

(56) References Cited

U.S. PATENT DOCUMENTS

| | | | | |
|---|---|---|---|---|
| 4,983,870 A * | 1/1991 | McSparran | ............... | 310/90.5 |
| 5,574,322 A * | 11/1996 | Nii et al. | ............... | 310/90.5 |
| 5,789,836 A * | 8/1998 | Hayakawa | ............... | 310/90 |
| 6,250,808 B1 * | 6/2001 | Ichiyama | ............... | 384/100 |
| 6,498,411 B2 * | 12/2002 | Kanebako | ............... | 310/90.5 |
| 6,717,308 B2 * | 4/2004 | Chen et al. | ............... | 310/90 |
| 6,831,385 B2 * | 12/2004 | Hasegawa et al. | ............... | 310/90.5 |
| 6,841,908 B2 * | 1/2005 | Hasegawa et al. | ............... | 310/90.5 |
| 7,271,370 B2 * | 9/2007 | Koch et al. | ............... | 219/619 |

* cited by examiner

*Primary Examiner*—Thanh Lam
(74) *Attorney, Agent, or Firm*—Duane Morris, LLP

(57) ABSTRACT

An electric machine having a hybrid bearing for the purpose of supporting a rotor with respect to a stator, the hybrid bearing consisting of a radial bearing, taking the form of a fluid dynamic bearing, and an axial bearing that is made up of magnetic elements, wherein the magnetic elements comprise at least one permanent magnet and one flux guide element that are disposed so as to be located opposite each other in a radial direction.

21 Claims, 7 Drawing Sheets

Fig. 3
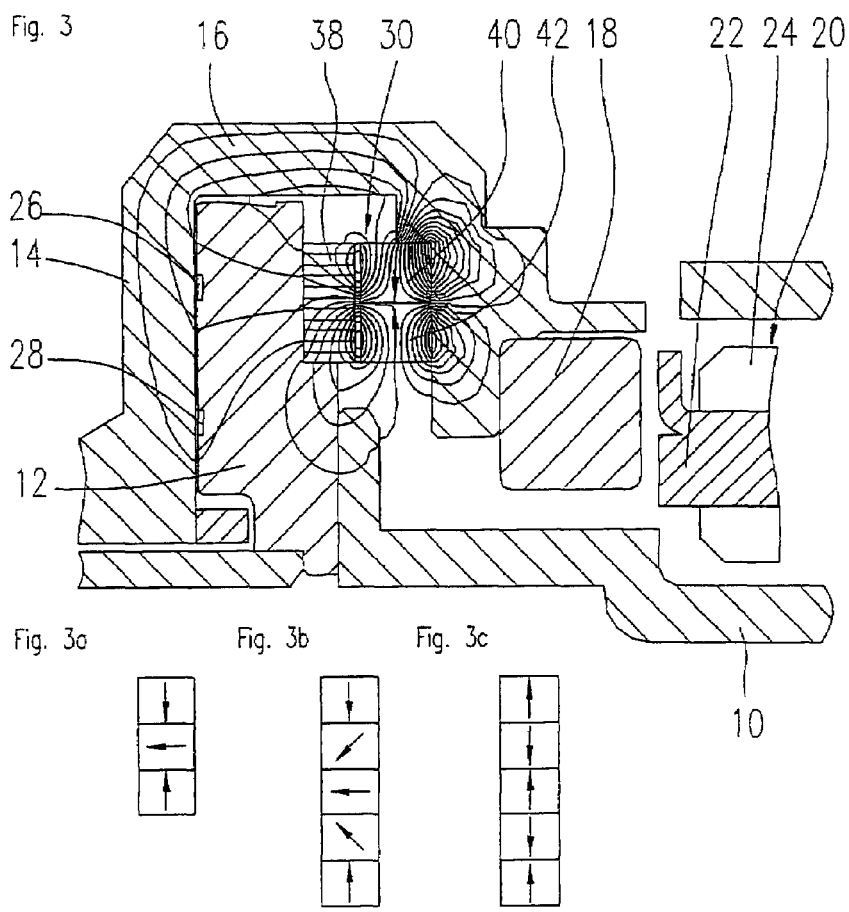
Fig. 3a   Fig. 3b   Fig. 3c
Fig. 4
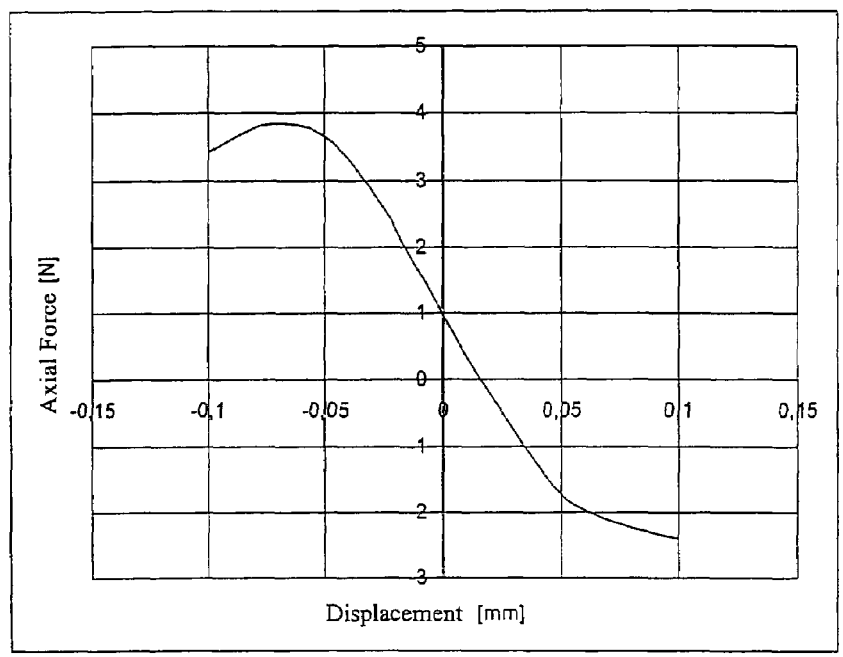

ELECTRIC MACHINE HAVING A HYBRID BEARING

The invention relates to an electric machine having a hybrid bearing. A machine of this kind is described, for example, in U.S. Pat. No. 6,172,847 B1.

FIELD OF THE INVENTION

Background of the Invention

A preferred area of application for the invention is in the field of spindle motors and other small-scale permanent magnet motors that are employed in hard disk drives having a disk diameter of 2.5 inches, 1 inch or less. Electronically commutated brushless direct current motors are preferably used here. For spindle motors having the type of construction applicable here, the motor shaft is coupled to a hub that is used to receive one or more hard disks. A rotor magnet is connected to the hub and disposed coaxially to a stator.

In U.S. Pat. No. 6,172,847 B1 a hard disk drive is described, for example, in which a shaft is connected to a rotor hub that carries the hard disk and is coupled to the rotor. The shaft is led into a bearing sleeve, a hydrodynamic radial bearing and an axial thrust bearing being formed between the bearing sleeve and the shaft. The axial thrust bearing is preloaded using magnetic elements in order to reduce starting torque.

The application, theory and computation of magnetic bearings have been dealt with extensively in the relevant literature. There is no doubt that magnetic bearings are particularly useful in terms of reducing bearing friction. The main problem with passive magnetic bearings is the need for stabilizing systems for at least one degree of freedom because magnets alone are not able to keep a bearing in stable equilibrium. It is accordingly impossible to create a stable bearing using only permanent magnets. To achieve magnetic levitation it is thus necessary to have additional stabilizing systems. Numerous solutions to this problem have been suggested in the prior art.

For example, R. F. Post, "Stability Issues in Ambient-Temperature Passive Magnetic Bearing Systems", Lawrence Livermore National Laboratory, UCRL-ID-137632, 17 Feb. 2000, describes magnetic bearing systems that use special combinations of levitation and stabilizing elements. Post mentions three main components that are cumulatively necessary in order to create a bearing that satisfies Earnshaw's theorem. The first component consists of a pair of ring magnets, of which one magnetic ring is stationary and the other rotational for the purpose of generating levitation. Another element used for stabilization is referred to by Post as a "Halbach Stabilisator". This element makes use of individual permanent magnets that are disposed according to a Halbach magnetic field distribution and lie opposite associated conductors. The third element is a mechanical bearing system that comes into operation at low speeds but at high speeds should be de-coupled as far as possible. Post moreover discusses the use of attenuation systems based on eddy currents. The system presented by Post appears to be relatively complex and is not suitable for use in electric machines that are intended for mass production, and in particular is not suitable for spindle motors for use in mini disk drives having a form factor of 2.5 inches, 1 inch or less.

U.S. Pat. No. 5,541,460 describes a spindle motor having passive magnetic axial bearings as well as a pivot-type bearing that may be realized as a hydraulic bearing or a ball bearing. The passive magnetic axial bearing generates an attractive force in an axial direction, and the pivot-type bearing stabilizes the arrangement so as to produce a bearing system that is also stable in a radial direction. A similar prior art is also described in U.S. Pat. No. 5,561,335 and in U.S. Pat. No. 5,545,937.

US 2003/0042812 A1 describes a passive magnetic bearing for a horizontal shaft having levitation and stabilizing elements. The levitation element consists of a pair of stationary curved ferromagnetic segments that lies within an annular, radially-acting magnet arrangement. The magnet arrangement is disposed at the inner circumference of a hollow shaft. The attractive force between the curved segments and the magnet arrangement acts both vertically in order to lift the shaft as well as horizontally in order to centralize the shaft. The stabilizing element consists of an annular magnetic Halbach arrangement and a stationary annular circuit that is disposed within the Halbach arrangement. The Halbach arrangement is positioned at the inside circumference of the hollow shaft. A repulsive force between the Halbach arrangement and the circuit increases in inverse proportion to the radial distance between these two parts and thus acts as a restoring force in order to bring the shaft into a state of equilibrium should it be moved out of this state. The bearing is configured such that alternating currents are generated between the magnetic and ferromagnetic components, which generate corresponding alternating current losses.

US 2003/0117031 A1 describes a magnetic bearing for a spindle motor having a magnet component that is mounted between the baseplate and the motor spindle. The magnet component comprises an inner and an outer magnet section that are disposed coaxially and repulse one another so that the spindle levitates and mechanical friction is minimized. The magnetic bearing is disposed in a stationary shaft for the purpose of supporting a rotating spindle, the tip of the spindle being supported by a counterpart of the baseplate.

US 2004/0046467 A1 describes a magnetic bearing arrangement having passive (axial) magnetic thrust bearings and having radial sliding bearings or ball bearings for a rotor motor.

In summary, the prior art reveals magnetic bearings having stabilization systems that comprise: steel or diamond thrust bearings based on ball bearings; magnetic fluid bearings; eddy current elements; sliding bearings as axial thrust bearings; as well as hybrid passive magnetic bearings that are combined with hydro or fluid dynamic bearings respectively or air bearings.

The invention has the object of providing an electric machine having a hybrid bearing that operates with minimum friction both at start-up as well as in stable operation and which is particularly suitable for application in spindle motors for mini disk drives.

SUMMARY OF THE INVENTION

The invention provides an electric machine having a hybrid bearing for the purpose of supporting a rotor with respect to a stator, the hybrid bearing comprising a radial bearing and an axial bearing. In the preferred embodiment of the invention, the radial bearing is a fluid dynamic bearing. The axial bearing is made up of magnetic elements, particularly of at least one permanent magnet and a flux guide element that are disposed so as to be located opposite each other in a radial direction. The axial bearing formed from the magnetic elements is fully contactless and establishes a stable state of levitation in an axial direction between the shaft and the bearing sleeve. The fluid dynamic bearing stabilizes the magnet system in a radial direction. The operating principle of the bearing according to the invention is based on the fact that the magnetic elements attract each other in a radial direction and thereby align themselves in an axial direction with respect to one another in order to maintain the desired state of levitation.

This eliminates any need whatsoever for a conventional axial bearing, such as an axial thrust bearing, a pivot-type bearing or a ball bearing. The air gap between the end face of the shaft and the base of the bearing sleeve can be made relatively large and can be maintained when the electric machine is at a standstill, so that the bearing generates minimum friction both during the start-up of the machine as well as during its stable operation. The current consumption of the electric machine is also thereby reduced compared to the prior art.

In one embodiment of the invention, the hybrid bearing comprises a bearing sleeve in which a shaft is accommodated. The shaft is coupled to a hub, to receive, for example, the disks of a hard disk drive, and one of the magnetic elements is disposed at the outside circumference of the bearing sleeve, whereas the other magnetic element is connected to the hub. The hub preferably encloses the bearing sleeve so that a space is formed between the bearing sleeve and the inside circumference of the hub to receive the magnetic elements. In this configuration, the second one of the magnetic elements is preferably disposed at the inside circumference of the hub.

In another embodiment of the invention, the magnetic axial bearing is formed between the bearing sleeve and the shaft.

In the preferred embodiment of the invention, the magnetic elements have approximately the same dimensions in an axial direction and are aligned with each other in a radial direction. The magnetic elements are preferably annular in shape and aligned concentrically with respect to one another. The magnetic elements can thereby be aligned optimally in an axial direction with respect to one another in order to ensure a stable state of levitation in an axial direction.

In a first variant of the invention the flux guide element is made up of a stack of laminations whose laminations are oriented in a radial direction. In this embodiment, the permanent magnet comprises a ring magnet that is magnetized in an axial or a radial direction. In this variant the edges of the flux guide element are magnetically active, so that magnetic flux lines are formed between the flux guide element and the permanent magnet mainly in the region of its edges.

The lamination stack of the flux guide element is preferably made up of laminated sheets of electric steel. Using a stack of laminations as the flux guide element makes it possible to totally preclude eddy currents, so that no eddy current losses whatsoever occur.

In a second variant of the invention, in which the flux guide element is likewise made up of a stack of laminations, the permanent magnet comprises one or more ring magnets that are magnetized in an axial direction according to a Halbach arrangement. The simplest form of this kind of Halbach magnetization is the use of two adjacent ring magnets that are magnetized inversely in an axial direction, although the invention is not limited to the simplest variant.

In this second variant of the invention, the magnetic flux lines between the permanent magnet and the flux guide element are mainly concentrated at the axial center of the magnetic arrangement, so that the flux guide element may be suitably varied over its axial length allowing it to take up more magnetic flux lines at its center than in the region of its edges. To this effect, the laminations of the stack of laminations can be made thinner at the center of the lamination stack than at the region of the edges. Other geometric variations for the laminations of the lamination stack of the flux guide element are also possible.

In a third variant of the invention the flux guide element and the permanent magnet each comprise one or more ring magnets that are magnetized in a radial direction according to a Halbach arrangement. In its simplest realization, this variant is realized with two ring magnets each on the side of the rotor and of the stator that are magnetized inversely in a radial direction. In this embodiment, the magnetic bearing can take up particularly large axial loads which, depending on the design, may amount to 10 to 40 Newton or more.

A common feature of the hybrid bearings according to the various embodiments of the invention is that the magnetic axial bearing achieves stabilization in an axial direction but is unstable in a radial direction. This means that the bearing has to be stabilized in a radial direction, where, according to the invention, a fluid dynamic bearing is preferably used for this purpose. The operational gap of the fluid dynamic bearing, i.e. the gap between the shaft and the bearing sleeve, should preferably be smaller than the air gap between the magnetic elements to prevent damage to the magnets when the bearing is tilted. Furthermore, an oil-filled bearing should preferably be used in order to further attenuate any tilting motion.

The bearings according to the variants of the invention mentioned above differ from one another with respect to their characteristic curves of the axial restoring force over the axial displacement, as is described in more detail with reference to the figures.

In the preferred embodiment of the invention, the bearing sleeve is made of a non-magnetic or a ferromagnetic material, the magnetic permeability of the flux guide element being preferably distinctly greater than that of the bearing sleeve. The hub is preferably made of a ferromagnetic material.

SHORT DESCRIPTION OF DRAWINGS

The invention is described in more detail below on the basis of the preferred embodiments with reference to the drawings.

FIG. 3 is a sectional schematic partial view of an electric machine according to a second embodiment of the invention;

Figure 5:
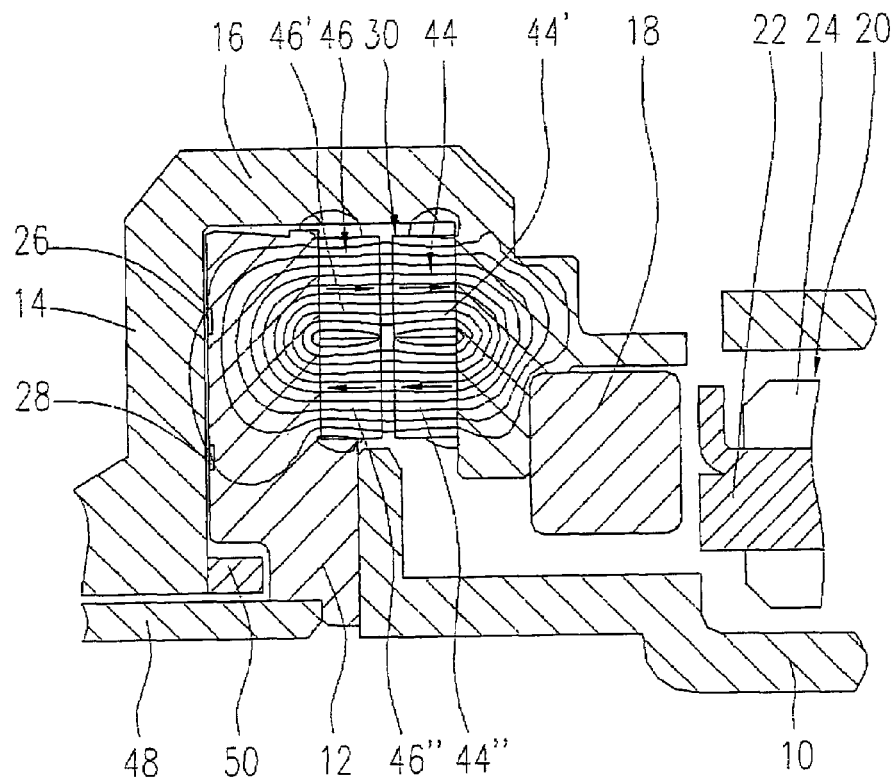
Figure 6:
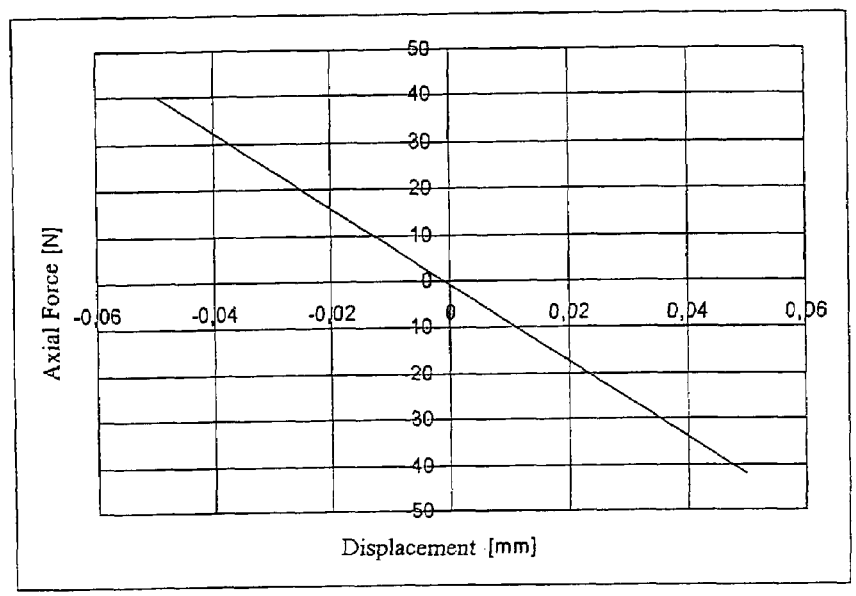
Figure 7:
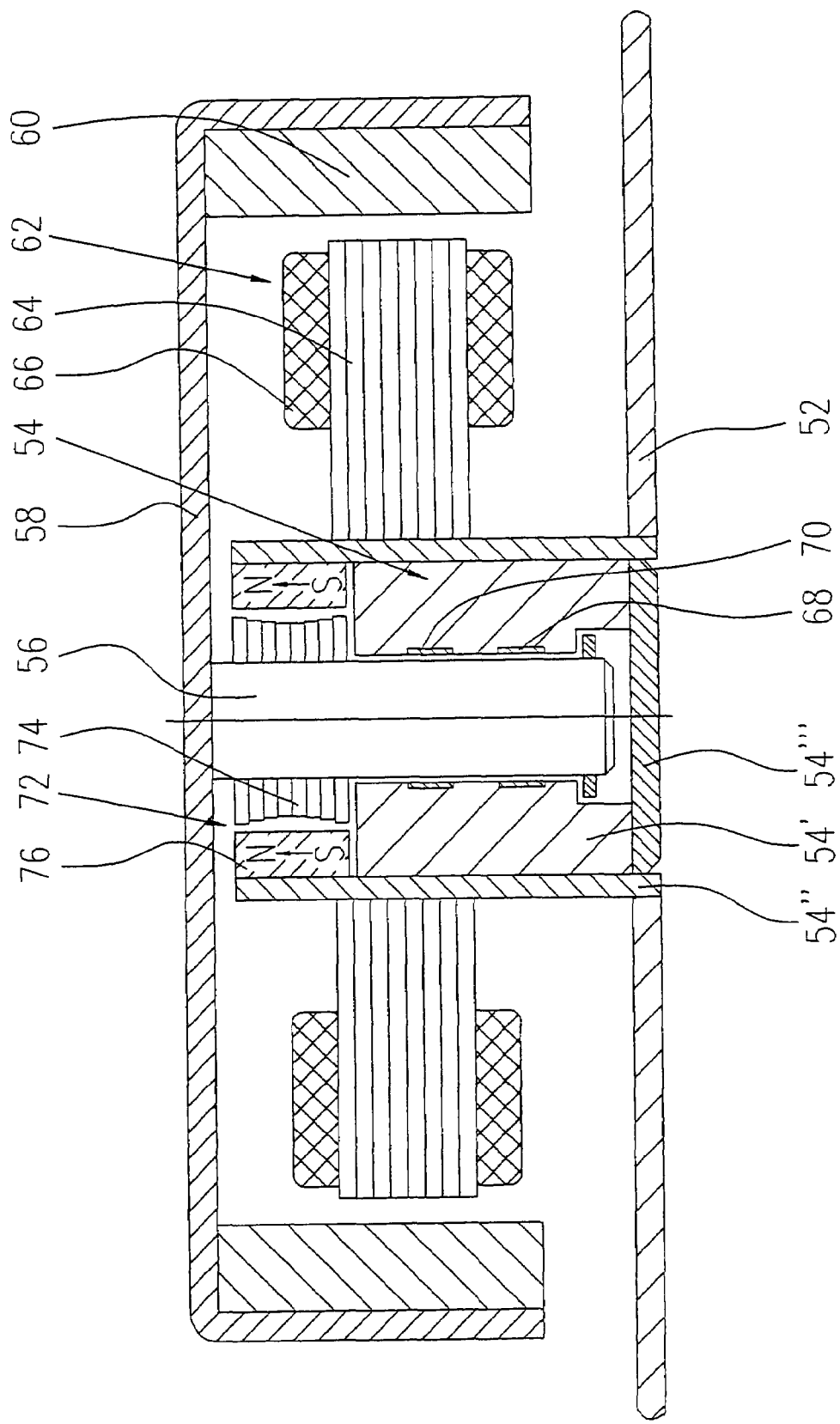
Figure 8:
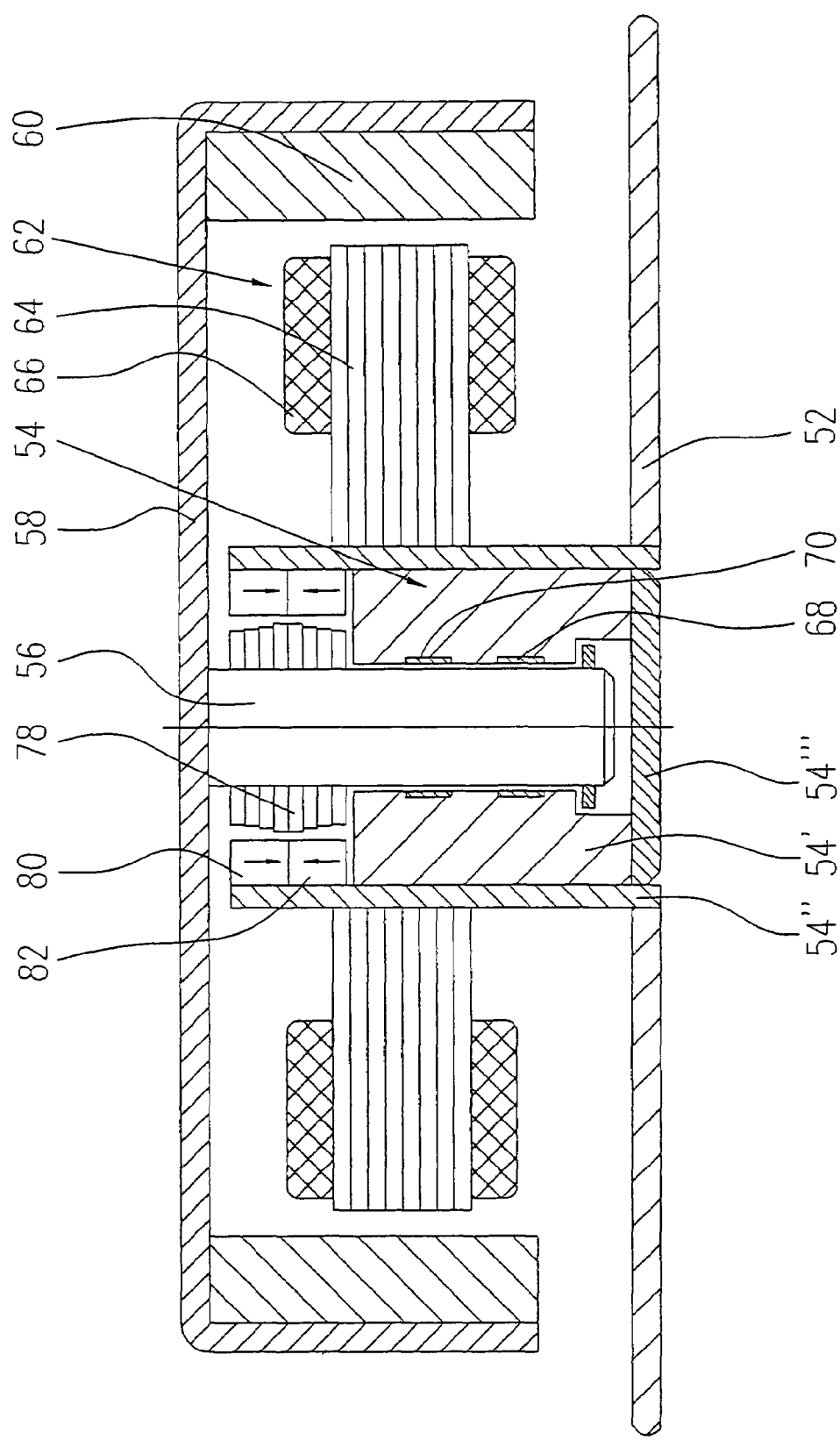
Figure 9:
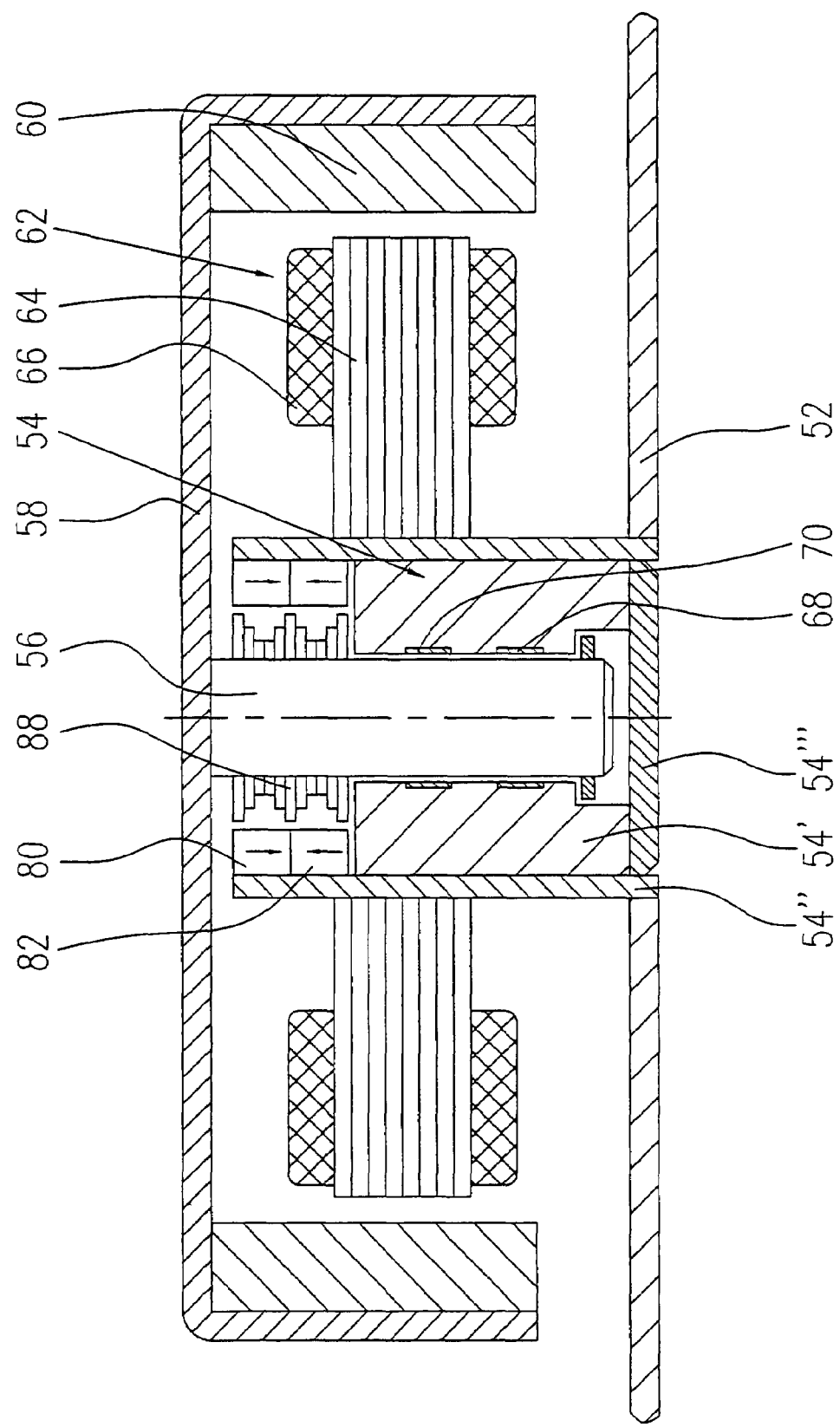
Figure 10:
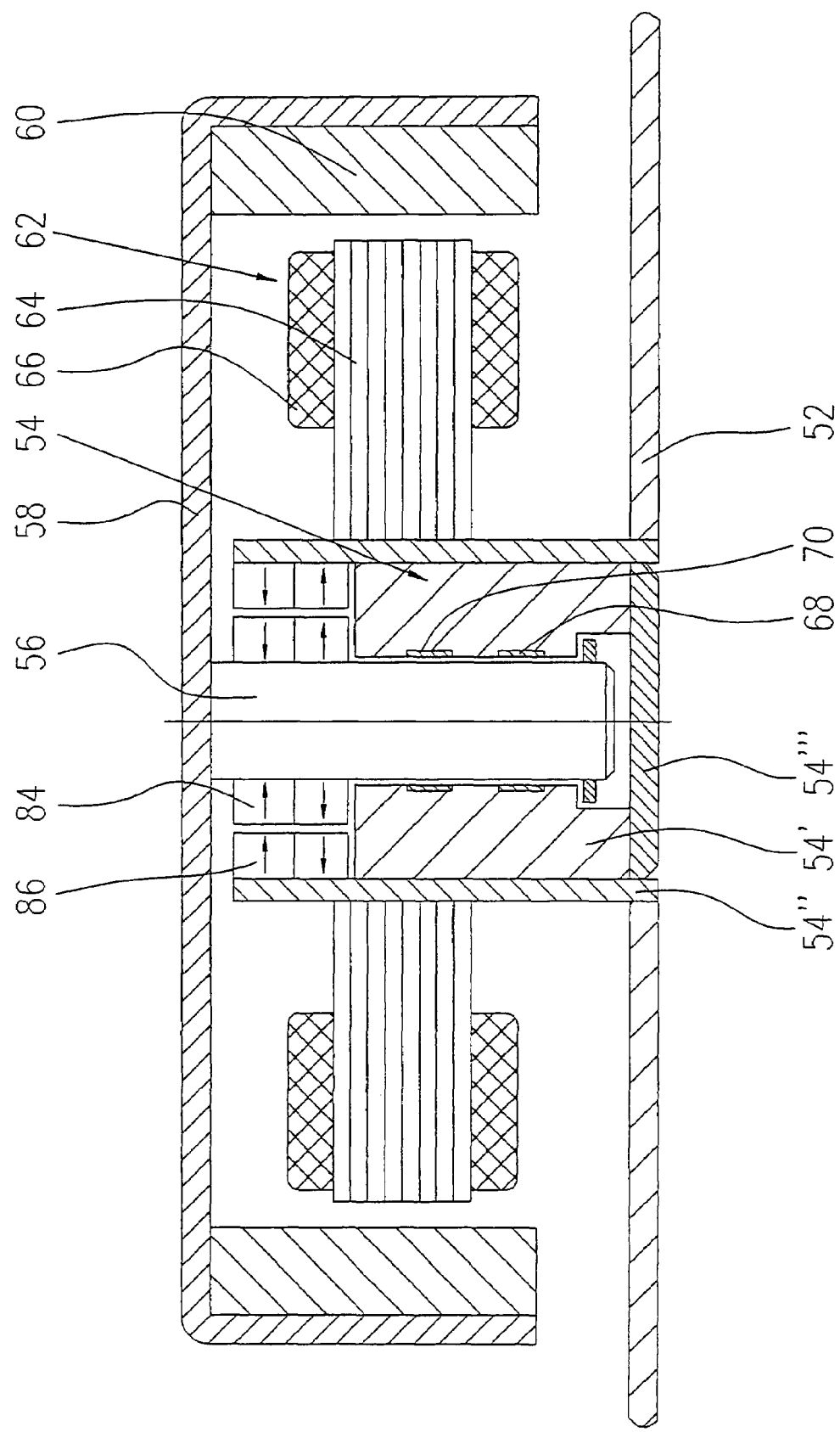

FIGS. 3a 3b, and 3c are schematic views for alternative configurations of the permanent magnets;

FIG. 4 illustrates the characteristic curve of the axial force in the electric machine generated by the magnetic bearing according to the second embodiment;

FIG. 5 is a sectional schematic partial view of an electric machine according to a third embodiment of the invention;

FIG. 6 illustrates the characteristic curve of the axial force in the electric machine generated by the magnetic bearing according to the third embodiment;

FIG. 7 is a sectional schematic view of an electric machine according to a modification of the first embodiment;

FIG. 8 is a sectional schematic view of an electric machine according to a modification of the second embodiment;

FIG. 9 is a sectional schematic view of an electric machine according to another modification of the second embodiment; and FIG. 10 is a sectional schematic view of an electric machine according to a modification of the third embodiment.

DESCRIPTION OF PREFERRED EMBODIMENTS

Figure 1:
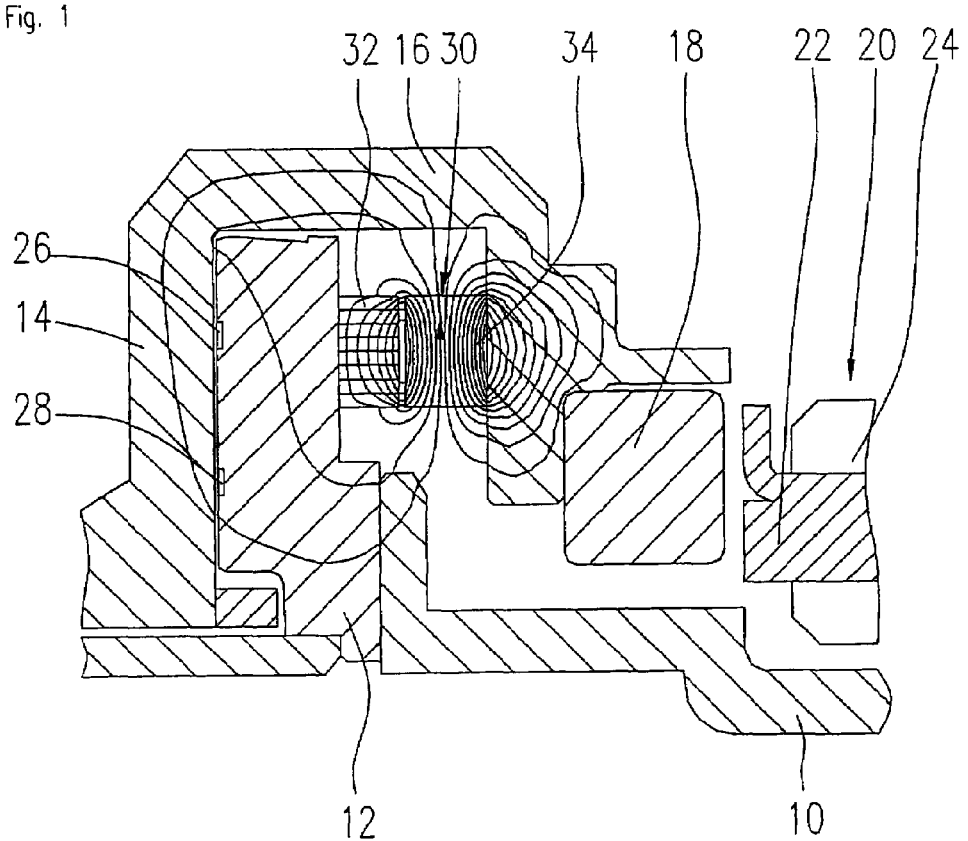
FIG. 1 is a sectional schematic partial view of an electric machine according to a first embodiment of the invention.

FIG. 1 shows a schematic, sectional partial view through an electric machine according to a first embodiment of the invention. In the preferred embodiment, the machine is designed as a spindle motor, particularly a brushless dc motor. The machine comprises a baseplate 10 in which a bearing sleeve 12 is held. The bearing sleeve 12 receives a shaft 14 that is connected to a hub 16. In the embodiment of FIG. 1, the shaft 14 is shown with a central bore and forms an integral part of the hub. The hub 16 carries a rotor magnet 18 that is disposed coaxially with respect to a stator 20. The stator 20 is shown schematically in FIG. 1 by a part of the stator lamination stack 22 and the winding 24. Further details on the basic construction of an electric machine of the design according to FIG. 1 are given, for example, in German Patent Application DE 10 2005 042519.4.

The bearing sleeve 12 can be made of a magnetic or a non-magnetic material, and the hub 16 is preferably made of a ferromagnetic material. In the illustrated embodiment, the hub 16 is designed such that it can receive one or more storage disks of a hard disk drive.

Two radial bearings taking the form of fluid dynamic bearings are formed between the bearing sleeve 12 and the shaft 14. To this effect, the gap between the bearing sleeve 12 and the shaft 14 is preferably filled with a bearing oil, and pressure-generating grooves are formed on the inside circumference of the bearing sleeve 12 or on the outside circumference of the shaft 14, as is basically known in the prior art.

In the illustrated embodiment, the axial bearing 30 is formed by the interaction of a laminated stack of metal sheets 32, which, like the stator lamination stack, can be made up of electric steel sheets, and a permanent magnet 34. The lamination stack 32 and the permanent magnet 34 are each annular in shape and disposed concentrically with respect to one another. They preferably have the same dimensions in an axial direction and are aligned in a radial direction, as illustrated in FIG. 1. The laminations of the lamination stack 32 are oriented in a radial direction, so as to pre-vent the formation of eddy currents in the lamination stack 32. In the illustrated embodiment, the permanent magnet 34 is magnetized in an axial direction. However, depending on the design of the machine, the permanent magnet 34 may also be magnetized in a radial direction.

As illustrated in FIG. 1, in this first embodiment of the invention, the edges of the stack of laminations 32 is particularly active, so that the majority of magnetic flux lines between the permanent magnet 34 and the lamination stack 32 flows in the region of the outer laminations. If the rotor 18 and the hub 16 is deflected in an axial direction with respect to the bearing sleeve 12 and the baseplate, the interaction of the lamination stack 32 and the permanent magnet 34 generates a restoring force in an axial direction that holds the rotor and the hub with respect to the baseplate and the bearing sleeve in a stable state of levitation in an axial direction. The permanent magnet 34 further attracts the stack of laminations 32 in a radial direction, stabilization in a radial direction being effected by the radial bearings 26, 28.

The bearing sleeve 12 is preferably made of a ferromagnetic or non-magnetic material, the magnetic permeability of the bearing sleeve being distinctly less, i.e. by at least one order of magnitude, than that of the stack of laminations 32.

The arrangement according to the invention makes it possible to significantly reduce friction in the bearing since there is no need whatsoever for an axial thrust bearing and the axial air gap can accordingly be made large. The passive magnetic bearing is also effective when the electric machine is not in operation, so that even on start-up of the machine no significant friction torque needs to be overcome.

As can be seen from FIG. 1, axial centering forces between the rotor magnet 18 and the stator 20 are also generated to a certain degree by the present invention, however, compared to the restoring force of the magnetic bearing 32, 34, these forces are negligible and not necessary to the function of the bearing.

Figure 2:
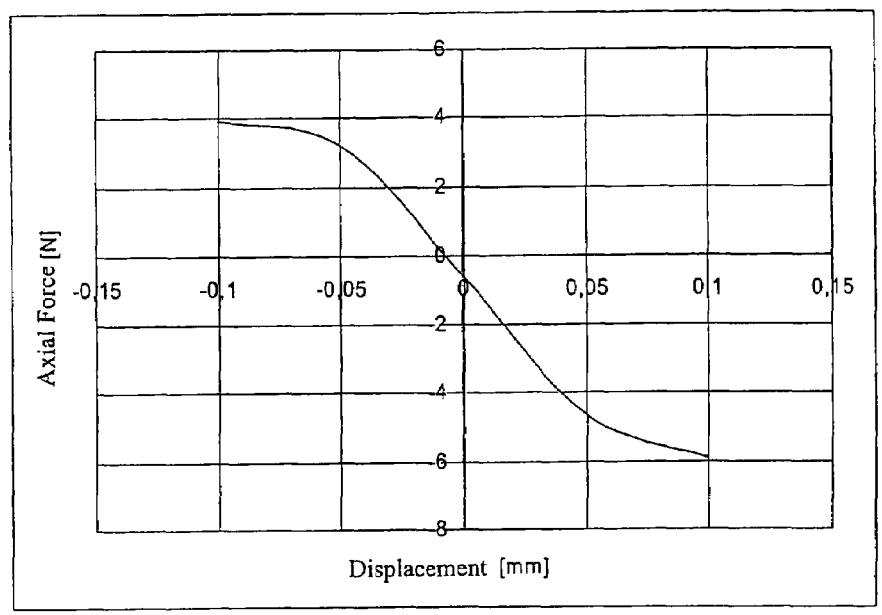
FIG. 2 illustrates the characteristic curve of the axial force generated in the electric machine by the magnetic bearing according to the first embodiment.

FIG. 2 shows the characteristic curve of the axial restoring force of the magnetic bearing in relation to its deflection in an axial direction vis-à-vis a stable situation. As illustrated in FIG. 2, restoring forces in the region of four to six Newton can be achieved in this embodiment, where the restoring forces may vary depending on the design and the dimensions of the electric machine, and the absolute values of FIG. 2 should only be taken as examples. As can also be seen from FIG. 2, the characteristic curve of the axial restoring force shows a certain asymmetry, which results from the influence of the ferromagnetic hub 16.

FIG. 3 shows a schematic, sectional partial view of an electric machine according to a further embodiment of the invention. The same components appearing in FIG. 1 are indicated with the same reference numbers. The embodiment of FIG. 3 differs from the first embodiment in the construction of the axial bearing 30. As in the first embodiment, the axial bearing 30 is designed as a passives magnetic bearing and comprises a stack of laminations 38 whose laminations are oriented in a radial direction. The stack of laminations is preferably made up of laminated electric steel sheets. Instead of the single permanent magnet ring 34, the second embodiment comprises one or more permanent magnet rings having a Halbach arrangement. FIG. 3 shows the simplest embodiment of this kind of Halbach arrangement in which two permanent magnet rings 40, 42 magnetized inversely in an axial direction are provided. FIGS. 3a, 3b and 3c show modifications of this embodiment in which a Halbach arrangement is more closely approximated.

In the embodiment illustrated in FIG. 3, the flux lines are concentrated at the center of the stack of laminations 38 and are denser there than at the edges. Hence provision can be made in the second embodiment of the invention for the stack of laminations 38 to be designed such that its geometry varies over its axial length. For example, the laminations at the center of the stack of lamination 38 can be made thinner than at its edge. It is also possible to let the laminations at the center and at the outer edges of the stack of laminations to project further than in the other regions in order to support the flux line concentration. The largest restoring force of the magnetic bearing is thus produced at its center.

FIG. 4 again shows the characteristic curve of the axial restoring force over the deflection in an axial direction for the second embodiment. In the embodiment of FIGS. 3 and 4, a stronger influence of the ferromagnetic hub 16 can be identified resulting in a corresponding asymmetric characteristic curve of the axial restoring force.

FIG. 5 shows a third embodiment of an electric machine according to of the invention in a schematic, partially sectional view. Parts corresponding to those in the preceding embodiments are indicated by the same reference numbers.

The third embodiment differs from the preceding embodiments in that the magnetic axial bearing 30 is formed by two opposing permanent magnet rings 44, 46 that are magnetized in a radial direction and form a Halbach arrangement. In the embodiment of FIG. 5, the Halbach arrangement is again illustrated in its simplest variant, namely with two permanent magnets 44', 44" and 46', 46"magnetized inversely in a radial direction. The magnets 44', 44"; 46', 46" attract each other in a radial direction and thus hold the rotor 18 and the hub 16 in a state of levitation with respect to the bearing sleeve 12 and the baseplate 10. Stabilization in a radial direction is effected, as in the preceding embodiments, by the radial bearings 26, 28.

As can be seen from the characteristic curve of FIG. 6, the third embodiment generates a considerably higher restoring force than the first two embodiments, which, depending on the design, may be considerably over 10 Newton, even up to 40 Newton and more. Furthermore, the characteristic curve of the axial restoring force over the axial deflection is substantially linear in this embodiment.

The additional comments made above with reference to the first embodiment apply also to the second and third embodiments. Also holding true for all embodiments of the invention is that the magnetic bearing 30 should be aligned in an axial direction as close to the center of the bearing sleeve 12 as possible, in order to largely prevent any tilting of the bearing. The air gap between the bearing sleeve 12 and the shaft 14, i.e. the air gap of the fluid dynamic bearing, should also preferably be smaller than the air gap between the magnets in order to prevent damage to the magnets during any tilting motion of the bearing. The provision of oil in the fluid dynamic bearing can further dampen tilting motions.

The embodiment of FIG. 5 differs further from the preceding embodiments in that the bearing sleeve 12 is sealed at its closed end by a counter plate 48 and that a separate ring is placed on the appropriate end face of the shaft 14, which safeguards the shaft 14 from falling out of the sleeve 12. These differences, however, are not relevant to the invention.

FIGS. 7 to 10 show modifications on the first, second and third embodiment of the invention respectively. They differ from the above-described embodiments through the respective arrangement of the stator and rotor and through the arrangement of the magnetic axial bearing.

The electric machine according to each of the embodiments of FIGS. 7 to 10 comprises a baseplate 52, in which a multipart bearing sleeve 54 is accommodated. The bearing sleeve 54 comprises an inner sleeve 54' and an outer sleeve 54" that are sealed at their end face by a counter plate 54'''. A shaft 56 is accommodated in the bearing sleeve 54 and connected to a hub 58. The hub carries a rotor magnet 60. A stator 62 having a stack of stator laminations 64 and windings 66 is connected to the outside circumference of the outer sleeve 54" and thus to the baseplate 52. Two radial bearings 68, 70 are formed between the inner sleeve 54' and the shaft 56, the radial bearings functioning substantially like the radial bearings 26, 28 of the first to third embodiments (FIGS. 1, 3 and 5). Unlike the first embodiment, the magnetic axial bearing 72 of FIG. 7 is made up of a stack of laminations 74 and an associated radially or axially magnetized permanent magnet 76, the laminations becoming narrower in a radial direction towards the center of the stack. Thus the distance of the laminations to the magnet is at its shortest at the two outer ends of the stack. Since the field concentration is the strongest here, the restoring force is particularly strong in this arrangement. The functioning of the electric machine of FIG. 7 is described with respect to FIG. 1; to this extent, reference is made to the description of FIG. 1.

The embodiments of FIGS. 8 to 10 are basically constructed in the same way as the embodiment of FIG. 7, corresponding components being indicated by the same reference numbers and not being described again. These embodiments only differ in the construction of the magnetic axial bearing, the axial bearing of FIGS. 8 and 9 being similar to that of FIG. 3 and the axial bearing of FIG. 10 to that of FIG. 5. In this respect, reference is made to the description of these figures.

Thus in FIGS. 8 and 9, the magnetic axial bearing is made up of a stack of laminations 78, 88 and two associated permanent magnet rings 80, 82 that are magnetized inversely in an axial direction. Its functioning is the same as described with reference to FIG. 3. Again in the embodiment of FIG. 8, the width of the laminations 78 varies in an axial direction such that the radial dimension of the laminations decreases starting from the center of the stack towards its end faces. This means that the distance of the laminations 78 to the magnet is shortest at the center, where the magnetic field concentration is the largest. This arrangement again results in particularly large restoring forces.

In the embodiment of FIG. 9, also the width of the laminations 88 varies in an axial direction such that the laminations 88 become narrower from the center of the stack towards the end faces. However, from the middle of each magnet ring 80, 82 the width of the laminations 88 is again increasing to a maximum width at their axially outer ends. This means that the distance of the laminations to the magnet is short at the center and at the end faces where the magnetic field concentration is the largest.

In the embodiment of FIG. 10 as in the embodiment of FIG. 5, the magnetic axial bearing is made up of two opposing permanent magnet ring pairs 84, 86 magnetized in a radial direction. The functioning of this magnetic axial bearing is as described with reference to FIG. 5.

It again holds true for FIGS. 8, 9 and 10 that the permanent magnet rings 80, 82 or the permanent magnet ring pairs 84, 86 respectively represent the simplest form of an approximate Halbach arrangement and may be replaced by a magnet arrangement that approximates the Halbach arrangement more closely, as illustrated, for example, in FIGS. 3a and 3b.

To the extent that reference has been made in the above description to the materials used, to absolute or relative dimensions and to the functioning of the radial bearing and the axial bearing, such details may basically apply to all the embodiments, although design-related deviations may occur.

The electric machine according to the invention is particularly suitable for use as a spindle motor for mini disk drives in which the outside circumference of the hub has a diameter of approximately 7 to 8 mm or even less, such as 4.5 mm. The thickness of the magnet rings and the lamination rings is in the region of 0.5 mm to 1 mm, the laminations being made, for example, of electric steel and the permanent magnets of sintered neodymium. The invention, however, is not restricted in this respect.

The characteristics revealed in the above description, the claims and the figures can be important for the realization of the invention in its various embodiments both individually and in any combination whatsoever.

We claim:

1. An electric machine having a hybrid bearing for the purpose of supporting a rotor with respect to a stator, the hybrid bearing consisting of a radial bearing, taking the form of a fluid dynamic bearing, and an axial bearing that is made up of at least one magnetic element, wherein one of the at least one magnetic elements comprises at least one permanent ring magnet magnetized in the axial direction and one flux guide element comprising a stack of laminations whose laminations are oriented in a radial direction, the magnetic elements are disposed so as to be located opposite each other in a radial direction; said at least one permanent ring magnet and the one flux guide element defining a gap in the radial direction, said gap varies with respect to the axial position of the laminations in the stack of laminations.

2. An electric machine according to claim 1, wherein the hybrid bearing has a bearing sleeve in which a shaft is accommodated and that one of the magnetic elements is disposed at the circumference of the bearing sleeve and the other magnetic element is connected to the shaft.

3. An electric machine according to claim 1, wherein the hybrid bearing has a bearing sleeve in which a shaft is accommodated and that the shaft is coupled to a hub, and one of magnetic elements is disposed at the outside circumference of the bearing sleeve and the other magnetic element is connected to the hub.

4. An electric machine according to claim 3, wherein the hub encloses the bearing sleeve, a space being formed between the bearing sleeve and the inside circumference of the hub to receive the magnetic elements, and that the other magnetic element is disposed at the inside circumference of the hub.

5. An electric machine according to claim 1, wherein the magnetic elements are substantially aligned with each other in a radial direction.

6. An electric machine according to claim 1, wherein the magnetic elements are annular in shape and aligned concentrically with respect to one another.

7. An electric machine according to claim 6, wherein the magnetic elements have approximately the same dimensions in an axial direction.

8. An electric machine having a hybrid bearing for the purpose of supporting a rotor with respect to a stator, the hybrid bearing consisting of a radial bearing, taking the form of a fluid dynamic bearing, and an axial bearing that is made up of magnetic elements, wherein the magnetic elements comprise at least one permanent magnet and one flux guide element that are disposed so as to be located opposite each other in a radial direction,
wherein the magnetic elements are annular in shape and aligned concentrically with respect to one another,
wherein the magnetic elements have approximately the same dimensions in an axial direction,
wherein the flux guide element is made up of a stack of laminations whose laminations are oriented in a radial direction, and
wherein the permanent magnet comprises a ring magnet that is magnetized in an axial direction.

9. An electric machine according to claim 7, wherein the permanent magnet comprises two ring magnets that are inversely magnetized in an axial direction.

10. An electric machine according to claim 7, wherein the permanent magnet comprises one or more ring magnets that are magnetized in an axial direction according to a Halbach arrangement.

11. An electric machine according to claim 9, wherein the laminations of the lamination stack of the flux guide element have dimensions that vary over the axial length of the lamination stack.

12. An electric machine having a hybrid bearing for the purpose of supporting a rotor with respect to a stator, the hybrid bearing consisting of a radial bearing, taking the form of a fluid dynamic bearing, and an axial bearing that is made up of magnetic elements, wherein the magnetic elements comprise at least one permanent magnet and one flux guide element that are disposed so as to be located opposite each other in a radial direction,
wherein the magnetic elements are annular in shape and aligned concentrically with respect to one another,
wherein the magnetic elements have approximately the same dimensions in an axial direction,
wherein the flux guide element is made up of a stack of laminations whose laminations are oriented in a radial direction, and
wherein the laminations of the lamination stack are narrower at the center of the lamination stack than at the edge of the lamination stack.

13. An electric machine according to claim 11, wherein the laminations of the lamination stack are wider at the center of the lamination stack than at the edge of the lamination stack.

14. An electric machine according to claim 7, wherein the laminations of the lamination stack of the flux guide element are made of electric steel.

15. An electric machine according to claim 6, wherein the flux guide element and the permanent magnet each have two ring magnets that are inversely magnetized in a radial direction.

16. An electric machine according to claim 6, wherein the flux guide element and the permanent magnet each have one or more ring magnets that are magnetized in a radial direction according to a Halbach arrangement.

17. An electric machine according to claim 2, wherein the magnetic permeability of the flux guide element is greater than the magnetic permeability of the bearing sleeve and the shaft.

18. An electric machine according to claim 3, wherein the hub is made of a ferromagnetic material.

19. An electric machine according to claim 7, wherein the laminations of the lamination stack of the flux guide element have dimensions that vary over the axial length of the lamination stack.

20. The electric machine according to claim 1, wherein the gap is narrower at axial ends of the stack of laminations than at the center.

21. The electric machine according to claim 1, comprising at least two magnetic elements disposed axially.

* * * * *

UNITED STATES PATENT AND TRADEMARK OFFICE
CERTIFICATE OF CORRECTION

PATENT NO. : 7,786,638 B2  Page 1 of 1
APPLICATION NO. : 11/979444
DATED : August 31, 2010
INVENTOR(S) : Audrey Pulnikov It is certified that error appears in the above-identified patent and that said Letters Patent is hereby corrected as shown below:

Title page, item [73] assignee: should read as following --Minebea--

Signed and Sealed this

Ninth Day of November, 2010

David J. Kappos
*Director of the United States Patent and Trademark Office*